UNITED STATES PATENT OFFICE.

ANTON PFENNIGER, OF BRUGG, SWITZERLAND, ASSIGNOR TO THE FIRM OF CHEMISCHE FABRIK BRUGG A. G., VORMALS DR. ZIMMERMANN & CO., OF BRUGG, SWITZERLAND.

GREENISH-BLACK SULFUR DYE AND METHOD OF MAKING SAME.

SPECIFICATION forming part of Letters Patent No. 698,220, dated April 22, 1902.

Application filed September 6, 1901. Serial No. 74,556. (No specimens.)

*To all whom it may concern:*

Be it known that I, ANTON PFENNIGER, a citizen of the Swiss Republic, residing at Brugg, canton of Argovie, Switzerland, have invented new and useful Improvements in the Manufacture of Greenish-Black Directly-Dyeing Sulfurized Dyestuffs for Cotton, of which the following is a clear and complete specification.

The invention relates to the manufacture of new greenish-black directly-dyeing sulfurized dyestuffs for cotton by sulfurizing a paratoluene sulfonate.

The following example illustrates the invention: Into one hundred kilos of fused crystallized sodium sulfid are introduced twenty-one kilos of sodium paratoluene sulfonate, and the mixture is heated for about one hour while stirring at a temperature of 130° to 150° centigrade. After adding sixteen kilos of powdered sulfur the mixture is then heated at from 280° to 300° centigrade and kept at this temperature, while still stirring, until the formation of yellow vapors has ceased and a sample removed from the mass dissolves in water to a dark greenish-black solution. The mass is then allowed to cool, when it may be used directly in dyeing. It dissolves in water to a greenish-black solution, from which the dyestuff may be precipitated in the form of brown flocks by adding acid. These flocks are insoluble in pure water and in water containing sodium carbonate; but they dissolve in caustic-soda solution and in aqueous solutions of sodium sulfid.

The dyestuff dyes in hot baths containing sodium sulfid, sodium carbonate, and common salt or sodium sulfid, sodium carbonate, and sodium sulfate. The shades are greenish black and are very fast to light.

For sulfur and an alkali sulfid may be substituted alkali polysulfids or sulfur and an alkali.

The proportion of the sulfurizing agent used, as well as the duration of the heating, can be varied.

What I claim is—

1. The described process for the manufacture of greenish-black, sulfurized, directly-dyeing dyestuffs for cotton, by heating a paratoluene sulfonate with sulfurizing agents.

2. As a new article of manufacture, the described greenish-black, sulfurized dyestuff, derived from a paratoluene sulfonate, which dyes unmordanted cotton, in a bath containing alkali sulfid, sodium carbonate and common salt, in greenish-black shades fast to light.

In witness whereof I have hereunto signed my name, this 23d day of August, 1901, in the presence of two subscribing witnesses.

ANTON PFENNIGER.

Witnesses:
WILLY HOMBERGER,
JOSEPH VOLTZ.